United States Patent [19]

Omata et al.

[11] Patent Number: 4,605,572
[45] Date of Patent: Aug. 12, 1986

[54] PROCESS FOR INHIBITING CORROSION OF STEEL MATERIALS BUILT IN INORGANIC MATERIALS

[75] Inventors: Kazuo Omata, Ichikawa; Toshihiko Shimizu, Narashino; Hiroshi Ibe, Higashikurume; Kenji Hara, Chiba, all of Japan

[73] Assignee: Onoda Construction Materials Co., Ltd., Tokyo, Japan

[21] Appl. No.: 711,117

[22] Filed: Mar. 12, 1985

[30] Foreign Application Priority Data

Mar. 29, 1984 [JP] Japan .................. 59-59351

[51] Int. Cl.⁴ .............................................. B05D 1/36
[52] U.S. Cl. ................... 427/403; 427/140; 427/142
[58] Field of Search ............ 427/403, 140, 142; 106/14.21

[56] References Cited

U.S. PATENT DOCUMENTS

| | | | |
|---|---|---|---|
| 2,998,328 | 8/1961 | Munger et al. | 427/403 X |
| 3,030,664 | 4/1962 | Wijard | 427/403 X |
| 4,088,804 | 5/1978 | Cornwell et al. | 428/220 |
| 4,443,496 | 4/1984 | Obitsu et al. | 427/140 |
| 4,536,417 | 8/1985 | Shimizu | 427/140 |

FOREIGN PATENT DOCUMENTS 0121661  9/1981  Japan .................. 427/403

Primary Examiner—Thurman K. Page
Attorney, Agent, or Firm—Jordan and Hamburg

[57] ABSTRACT

The present invention relates to a process for inhibiting corrosion of an existing steel material built in an inorganic material by applying an aqueous solution of an inorganic salt and a cement composition having corrosion-inhibiting effects on the surface of the inorganic material.

5 Claims, 2 Drawing Figures

PROCESS FOR INHIBITING CORROSION OF STEEL MATERIALS BUILT IN INORGANIC MATERIALS

FIELD OF THE INVENTION

The present invention relates to a process for inhibiting corrosion of steel materials built in inorganic materials having a high chlorine ion concentration.

DESCRIPTION OF THE PRIOR ART

It has been known that steel materials are quite difficultly corroded under a high alkaline condition occurring in an inorganic substance such as concrete. The steel materials are, therefore, not corroded even when no corrosion inhibition treatment is utilized in general. However, it has also been known that when the inorganic material surrounding the steel material has a high chlorine ion concentration, the steel material is relatively easily corroded even under a non-neutralized, alkaline condition. The mechanism of this phenomenon may be explained as follows:

Under a highly alkaline condition, the steel material has an oxidized film of $\gamma$-$Fe_2O_3$ formed on its surface which film inhibits the corrosion of the steel material. This is called passivity. However, when chlorine ions are introduced therein by, for example, a chloride contaminant, the passivated film is broken. The breakage of the film occurs generally locally to expose the steel material. As a result, the exposed narrow part acts as an anode and the other broad part covered by the passivated film acts as a cathode to cause a large potential difference between them and, therefore, only the anode (narrow part) is corroded. As a result, so-called "pitting corrosion" takes place in spots on the surface of the steel material.

The effective sectional area of the steel material is rapidly reduced by the pitting corrosion and it is, therefore, dangerous even when the number of the spots is small. When the number of the spots is increased remarkably, the spots are interconnected with each other to finally spread all over the surface of the steel material.

In an initial stage of the corrosion of the steel material, ferrous hydroxide $Fe(OH)_2$ is formed. This compound is unstable and immediately oxidized into iron oxides such as $\alpha$-$FeOOH$ and $Fe_3O_4$ which are the main components of rust. In the course of the rust formation, the volume of the steel material expands. As a result, when the inorganic material reinforced by the steel material is reinforced concrete, the expansion is restricted by the concrete and, therefore, a high expansion pressure is applied to the concrete surrounding the reinforcing steel rods to frequently cause cracks along the rods in the surrounding concrete. When the cracking proceeds further, the surrounding concrete falls off. In the next stage, the corrosion of the steel rods further advances to increase the sectional breakage of the rods and finally the structure is broken.

Causes for the introduction of chlorine ions which thus damages the inorganic material having the steel material built therein (hereinafter referred to as "reinforced concrete", etc.) are as follows:

(1) use of sea sand as a fine aggregate,
(2) the location of the concrete structure in a marine environment,
(3) application of a deicer, and
(4) use of a chemical admixture containing a large amount of a chloride.

In using sea sand as the fine aggregate, the salt can be removed by washing it with water. In fact, however, it is difficult to completely remove the salt and therefore, this means is not so frequently employed.

Calcium chloride having a high chlorine ion content was used previously as a concrete admixture in a large amount so as to accelerate the hardening of the concrete. The chlorine admixture used is now reduced in amount but it was used for longer than 20 years in the past and reinforced concrete constructions containing a large amount of chlorine ions are still in existence.

Marine concrete structures are now increasing in number because of their easiness of maintenance. However, the structures are always exposed to the salt fed externally and its penetration cannot be prevented unless they are covered with a perfect water-impermeable coating.

Since it is thus difficult to prevent the penetration of the salt into the reinforced concrete structures, etc., the development of a process for inhibiting the corrosion of the steel materials even when the salt penetrates therein is demanded.

The specification of Japanese Pat. Nos. 937,065, and 941,253 have disclosed the use of a concrete admixture to inhibit the corrosion of the reinforcing rods in a reinforced concrete structure when the incorporation of a harmful amount of chlorine ions is unavoidable due to, for example, the use of sea sand. On the basis of this technique, "corrosion inhibitors for reinforced concrete" have been prescribed in JIS A 6205 and the effects of the concrete admixtures are highly evaluated.

However, these corrosion inhibitors have been used by kneading them with another inorganic material in a step of casting the concrete. Thus, it has not been considered yet to use the corrosion inhibitor as a repairing material (or reinforcing material) for existing reinforced concrete structures.

Inventors carried out intensive investigations of corrosion inhibiting effects on reinforcing rods obtained by applying said corrosion inhibitor to the surface of the inorganic material in an existing reinforced concrete structure or the like containing a harmful amount of the salt so as to effect impregnation. And the inventors previously found that this process was quite effective in inhibiting corrosion of the reinforcing rods. However the corrosion inhibition effect does not last for a long time by the mere application and impregnation, since the corrosion inhibitor is still soluble in water even after the aqueous corrosion inhibitor solution has been dried. After investigation made for the purpose of finding an effective process for preventing of corrosion inhibitor soluble in water, it has been found that said effect can be sustained by coating the surface of the structure with a concrete composition after the application of the corrosion inhibitor. The present invention has been completed on the basis of these findings.

SUMMARY OF THE INVENTION

The present invention provides (1) a process comprising subjecting the surface of an inorganic material having a steel material built therein to an aqueous solution of an inorganic salt having a corrosion-inhibiting effect on the steel material by applying it to the surface of the inorganic material to impregnate the material with the solution, and (2) a process comprising subjecting the surface of an inorganic material having a steel material built therein to a first step of applying an aqueous solution of an inorganic salt having a corrosion-inhibiting effect to the steel material to impregnate a material with the solution, and then a second step of further providing a topcoat of a cement composition, after the first step to the surface of the inorganic material.

An object of the present invention is to provide a process for inhibiting corrosion of steel materials built in inorganic materials which process is capable of inhibiting the corrosion of a steel material built in an inorganic material having a high chlorine ion concentration by effecting the treatment even after casting of a reinforced concrete.

The term "inorganic materials having steel materials built therein" herein includes reinforced concrete, steel-frame concrete, lath mortar, steel fiber concrete, etc.

The term "inorganic salts having a corrosion inhibition effect" (corrosion inhibitors for concrete, etc.) herein refers to those capable of controlling an electrochemical corrosion reaction by forming an anticorrosive film on an anode and a cathode when it is used in a small amount under a corrosive condition, i.e. in the presence of chlorine ions. The corrosion inhibitors may be classified into the following two groups:

(1) a group of anodic corrosion inhibitors:

This group includes nitrites, chromates, etc.

They oxidize the surface of the steel material directly or indirectly to form an intimate metal oxide film on said surface, whereby inhibiting the anodic reaction.

(2) a group of cathodic corrosion inhibitors:

This group includes carbonates, phosphates, polyphosphates, etc.

They form a film of a difficult water-soluble salt with another ion present under corrosive conditions on the surface of the steel material (cathodic parts) to inhibit the cathodic reaction.

The amounts of these corrosion inhibitors represented by percentages based on chlorine ions (in terms of the common salt) contained in an inorganic material, such as existing concrete, are as follows:

calcium nitrite at least 3%
sodium nitrite at least 3%
calcium phosphate [$Ca_3(PO_4)_2$] at least 4%
sodium chromate at least 2%

The corrosion inhibitor is necessitated in a large amount when the inorganic material such as concrete has been neutralized (carbonized), though a small amount thereof will suffice when the neutralization (carbonation) has not proceeded and the pH is high.

By the application of the corrosion inhibitor of the present invention, a neutralized (carbonized) state of the concrete can be returned to a strongly alkaline state, since the corrosion inhibitor is highly alkaline (for example, the most frequently used 30% calcium nitrite solution has a pH value of 11 to 12). Immediately after the application of the 30% calcium nitrite solution most frequently used as the corrosion inhibitor of the present invention to a mortar (having a ratio of cement to an aggregate of 1:3) or concrete, the depth of penetration was at least 4 mm. It has been found that said solution gradually penetrated therin by ionic diffusion with time.

The cement composition is a paste prepared by kneading a cement such as Portland cement, a Portland cement mixture, ultra-quick hardening cement (jet cement) or white cement with a suitable amount of water. The cement composition may be mixed with up to about 150%, based on the cement, of a fine aggregate the amount of which varies depending on the workability.

The cement composition according to the present invention may contain a polymer dispersion which improves the water proof properties of the cement composition. Though the amount of the polymer dispersion to be incorporated into said cement is not particularly limited because it varies depending on the variety thereof, it is preferred usually to use it in an amount of 0.5 to 25% (as solids) based on the cement. The most suitable polymer dispersion is an anionically polymerized styrene/butadiene rubber dispersion (SBR-A). There may also be used paraffin asphalt, rubber asphalt, vinyl acetate, ethlene /vinyl acatate copolymer, acrylic resin and epoxy resin emulsions as well as NBR, natural rubber, chloroprene and MMA•B latexes. In addition, an emulsifier and stabilizer may also be incorporated in the cement unless they cause any trouble.

BRIEF DESCRIPTION OF THE DRAWINGS

The accompanying drawings illustrate the test results, in which.

DESCRIPTION OF THE PREFERRED EMBODIMENTS:

The cement compositions were prepared by using the above-mentioned SBR-A and some other polymer dispersions and the depth of the neutralization (carbonation) and the area of corrosion of them were examined by the following test methods to obtain the results shown below:

(1) base mortars used:

(A) standard composition for evalution of performance of polymer dispersion according to JIS:

maximum particle size of aggregate: 0.3 mm
amount of cement: 25%
ratio of cement to sand (Toyoura standard sand): 1:3

(B)
maximum particle size of aggregate: 0.3 mm
amount of cement: 50%
cement filler
(C)
maximum particle size of aggregate: 1.2 mm
amount of cement: 30%
mending mortar for summer (2) Polymer dispersions used:
(a) SBR-A,
(b) ethylene/vinyl acetate/vinyl chloride terpolymer emulsion,
(c) acrylic ester emulsion,
(d) acrylic ester/styrene copolymer emulsion,
(e) ethylene/vinyl acetate copolymer emulsion,
(f) styrene/butadiene copolymer emulsion prepared by cationic polymerization,
(g) vinyl acetate/vinyl versatate copolymer emulsion (redispersible powder),
(h) vinyl acetate/laurate/versatate terpolymer (redispersible powder), and
(i) no polymer dispersion added.

(3) Ratio of base mortar to polymer dispersion: 100:4.5

(4) Amount of water (JIS A 1173)
Amount of water necessitated for the slump of 35 ±5%

(5) Test methods:
(A) depth of neutralization (carbonation)

A mortar sample was kept in carbon dioxide (100%, 4 kg/cm²) for 5h and then a phenolphthalein indicator was sprayed on the broken surface. The depth of a part not colored red was measured.

(B) Corroded area of reinforcing rod:

A sample comprising a mortar (4×4×8 cm) containing a reinforcing iron rod having a diameter of 10 mm and a length of 10 cm in the center thereof was dried in air at 60° C. for 2 days and then immersed in a 5% common salt solution at 20° C. for 2 days. This cycle was repeated 10 times in total. The corrosion was copied onto a polyethylene sheet and its development was prepared. After copying, the corroded area was determined by means of a video pattern analyzer.

Figure 1:
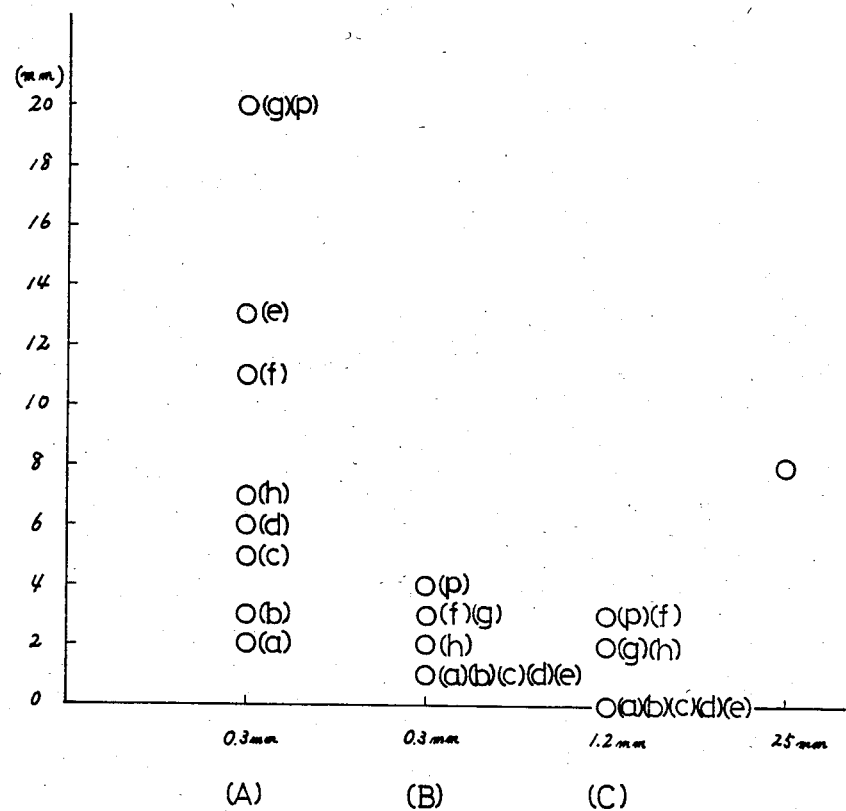
FIG. 1 shows the results of the depth of neutralization.

(6) Test results:

The results of the measurement of the depth of neutralization effected by using 8 polymer dispersions are shown in FIG. 1.

Figure 2:
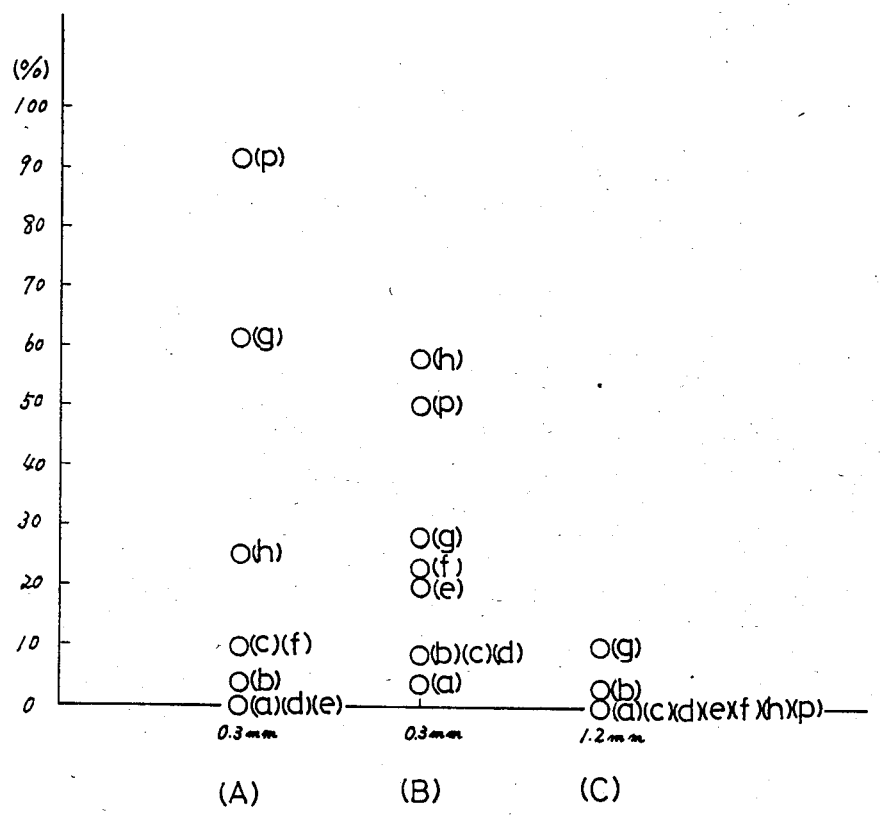
FIG. 2 shows the results of the measurement of the area of corrosion of a reinforcing rod.

The results of the measurement of the area of corrosion of reinforcing rod effected by using 8 polymer dispersions are shown in FIG. 2.

From the results of both cases shown in FIGS. 1 and 2, it is understood that SBR-A is superior to others.

In the treatment of exposed parts of reinforcing rods and marine structures, more excellent effects can be expected when a commercially available corrosion inhibitor for reinforced concrete is added to said cement compositon.

In the present invention, the cement composition (particularly polymer cement paste) is applied to the surface of the inorganic material impregnated with the aqueous solution of the corrosion-inhibiting inorganic salt to form a top coating so as to keep the corrosion-inhibiting effects of said inorganic salt permanently (the second invention). It has been found that the inorganic salts are effective in making the adhesion between the inorganic material and the polymer cement paste firm.

A 30% calcium nitrite solution was applied to flat concrete plates for a footway to form an under coating and a polymer cement paste was further applied thereto. The adhesion between them was measured to obtain the results shown in Table 1 below.

The adhesion test conditions were as follows:

Flat concrete plates for a footaway according to JIS A 5304 (300×300×60 cm) were partitioned into two portions. Calcium nitrite was applied thereto as described below, and the polymer cement paste was applied thereto. The tensile strength of each portion was measured by a method of JIS A 6915.

a. no treatment,
b. calcium nitrite only,

The obtained results clearly proved the effect of calcium nitrite in improving the adhesion.

EXAMPLE 1

A concrete-finished building having seven stories above and one under the ground (normal concrete construction up to 3 stories and light-weight concrete construction above the third story) built 15 years ago was repaired, since the concrete surface became powdery and cracked and the bleeding of the concrete and exposure of the iron reinforcing rods became serious.

The concrete of the building had a chlorine content of 0.042% (0.16% based on the fine aggregate) and a depth of neutralization (carbonation) of 25 to 35 mm. In the repair work, the concrete surface was washed with water under a high pressure and dried before a corrosion inhibitor for iron reinforcing rods containing 30% of calcium nitrite was applied thereto by means of a rolling brush twice repeatedly (400 g/m²) to effect the impregnation. And the concrete surface thus treated was dried and finished by applying multi-layer coatings with decorative pattern thereon.

One year after the repair, the building was inspected to find no trouble.

EXAMPLE 2

The same building as in Example 1 was washed with water under a high pressure and the corrosion inhibitor for iron reinforcing rods was applied thereto to effect the impregnation in the same manner as in Example 1. And polymer cement mortar containing 4.5% (in terms of solids) of SBR-A and having a ratio of cement to sand of 1:1 was sprayed thereon to form a film having a thickness of 2 mm. After hardening, multi-layer coatings with decorative pattern were applied thereon.

One year after the repair, the building was inspected to find no trouble.

Thus, according to the process of the present invention for inhibiting the corrosion of the steel material built in the inorganic material, the salt (chlorine ions) in the inorganic material of an existing structure can be made harmless easily. The iron reinforcing rods (steel material) in the inorganic material can be protected and the corrosion of them can be inhibited by the easy repair work according to the present invention.

TABLE 1

| sample | strength kg/cm² | Adhesion Test average strength kg/cm² | broken area (%) polymer cement | concrete | adhesion surface |
|---|---|---|---|---|---|
| no treatment | | | | | |
| 1 | 9.1 | 9.3 | 100 | 0 | 0 |
| 2 | 10.3 | | 70 | 30 | 0 |
| 3 | 8.6 | | 60 | 10 | 30 |
| treatment | | | | | |
| 1 | 11.3 | 11.5 | 95 | 5 | 0 |
| 2 | 11.6 | | 70 | 0 | 30 |
| 3 | 11.7 | | 90 | 5 | 5 |

What is claimed is:

1. A process for inhibiting corrosion of steel materials built in inorganic materials, which comprises subjecting the surface of an inorganic material having a steel material built therein by applying an aqueous solution of calcium nitrite which has a corrosion-inhibiting effect on said steel material to the surface of the inorganic material to impregnate said inorganic material with the solution.

2. A process for inhibiting corrosion of steel materials built in inorganic materials, which comprises subjecting the surface of an inorganic material having a steel material built therein to a first step of applying an aqueous solution of calcium nitrate having a corrosion-inhibiting effect on said steel material to the surface of the inorganic material to impregnate said inorganic material with the solution, and then a second step of further applying a topcoat of a cement composition containing a styrene/butadiene rubber dispersion obtained by an anionic polymerization (SBR-A) to said inorganic material in the order stated.

3. A process for inhibiting corrosion of steel material embedded in an inorganic material forming an existing structure, comprising the steps of applying an aqueous solution of calcium nitrite which has a corrosion-inhibiting effect on said steel material to the surface of said inorganic material and impregnating said inorganic material with said solution.

4. A process according to claim 3, wherein said solution gradually penetrates said inorganic material by ionic diffusion.

5. A process according to claim 3, wherein said inorganic material is concrete which is reinforced by said steel material.

* * * * *